(12) United States Patent
Jones et al.

(10) Patent No.: US 8,899,292 B2
(45) Date of Patent: Dec. 2, 2014

(54) FULLY SUPPORTED EXPANDABLE DECK

(75) Inventors: William A. Jones, West Midlands (GB); Stuart J. Hassell, West Midlands (GB)

(73) Assignee: Davian Enterprises, LLC, Greenback, TN (US)

( * ) Notice: Subject to any disclaimer, the term of this patent is extended or adjusted under 35 U.S.C. 154(b) by 529 days.

(21) Appl. No.: 12/904,265

(22) Filed: Oct. 14, 2010

(65) Prior Publication Data

US 2012/0090787 A1 Apr. 19, 2012

(51) Int. Cl.
*B29D 30/24* (2006.01)
*B29D 30/26* (2006.01)

(52) U.S. Cl.
CPC .............. *B29D 30/242* (2013.01); *B29D 30/24* (2013.01); *B29D 2030/2657* (2013.01)
USPC .......................................... 156/417; 156/420

(58) Field of Classification Search
CPC ...... B29D 30/12; B29D 30/24; B29D 30/242; B29D 2030/265; B29D 2030/2657; B31C 1/086; B21D 39/20; B21D 41/028; B28B 7/30; B28B 21/88
USPC .......... 156/417–420; 249/152, 170, 171, 180, 249/181, 185; 425/393, 403
See application file for complete search history.

(56) References Cited

U.S. PATENT DOCUMENTS

| | | | |
|---|---|---|---|
| 1,233,567 A * | 7/1917 | Furry | 249/10 |
| 3,077,918 A | 2/1963 | Noall | |
| 3,140,216 A | 7/1964 | Shilts et al. | |
| 3,837,968 A * | 9/1974 | Marra | 156/415 |
| 4,510,012 A * | 4/1985 | Kawaida et al. | 156/415 |
| 4,729,541 A * | 3/1988 | Maier | 249/18 |
| 5,203,947 A * | 4/1993 | Boeker | 156/417 |
| 5,709,768 A * | 1/1998 | Byerley | 156/406.2 |
| 2009/0242138 A1 | 10/2009 | Painter | |
| 2010/0101732 A1 | 4/2010 | Howley et al. | |

\* cited by examiner

*Primary Examiner* — Geoffrey L Knable
(74) *Attorney, Agent, or Firm* — Pitts & Lake, P.C.

(57) ABSTRACT

An expandable deck comprises a plurality of elongated deck carriers mounted upon an expansion mechanism in a generally parallel and cylindrical formation. A fixed rod is mounted upon a first one of the deck carriers. A pivot rod is mounted upon an adjacent second deck carrier. A pivot segment defines a rotation aperture and a guide slot. The rotation aperture is rotatably mounted upon the pivot rod and the guide slot slidingly receives the fixed rod.

5 Claims, 5 Drawing Sheets

FULLY SUPPORTED EXPANDABLE DECK

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to expandable decks for the manufacture of tubular assemblies.

More particularly, this invention pertains to fully supported expandable decks for the manufacture of tubular assemblies.

2. Description of the Related Art

In the manufacture of tires, for example, tires are generally built on cylindrical decks. The decks are expandable from a closed position, having a minimal diameter, to a fully expanded position. Locking mechanisms are provided so that the deck is usable for the manufacture of a variety of different sizes of tires.

Prior decks have employed plates having interwoven "fingers" which leave increasingly larger gaps as adjacent plates are moved apart to define a larger diameter for the deck. The outboard ends of the "fingers" are unsupported. As a result of the lack of support, when the deck is spun, at high speeds, centrifugal force causes the fingers to extend outwardly from the deck. In addition fingers can distort inwardly when tire components are consolidated on the expanded deck, potentially causing non-uniform tires. Non-uniform tires are unacceptable from noise and vibration standpoints.

It is generally desirable to use a single deck to build the largest variety of sizes of tires as possible with simple adjustments rather than replacement or addition of equipment to the deck. Prior decks have generally been limited to a diameter range. Prior efforts to provide expanded diameters on a single tire building apparatus have included attaching an additional deck upon the original deck to provide larger diameters. However, this does require additional apparatus, which takes additional time and cost for an operator to change.

BRIEF SUMMARY OF THE INVENTION

According to one embodiment of the present invention, a deck comprises a plurality of fixed segments mounted upon a fixed rod. Each fixed rod is secured to deck carriers by a clamp plate at each end. A plurality of fixed deck segments are mounted upon the fixed rod. A pivot rod extends parallel to and spaced from the fixed rod and provides a rotating pivot point for a plurality of pivot segments. Each pivot segment defines an aperture through which the pivot rod extends. Each deck pivot segment defines a guide slot through which an adjacent fixed rod extends to provide radial guidance for the pivot segment. The complete deck comprises a plurality interleaved fixed segments and pivot segments. The pivot segments are supported at two locations to prevent radial displacement.

The deck carriers are moved radially between a fully closed position and a fully extended position by a central mechanism as are well-known in the art.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
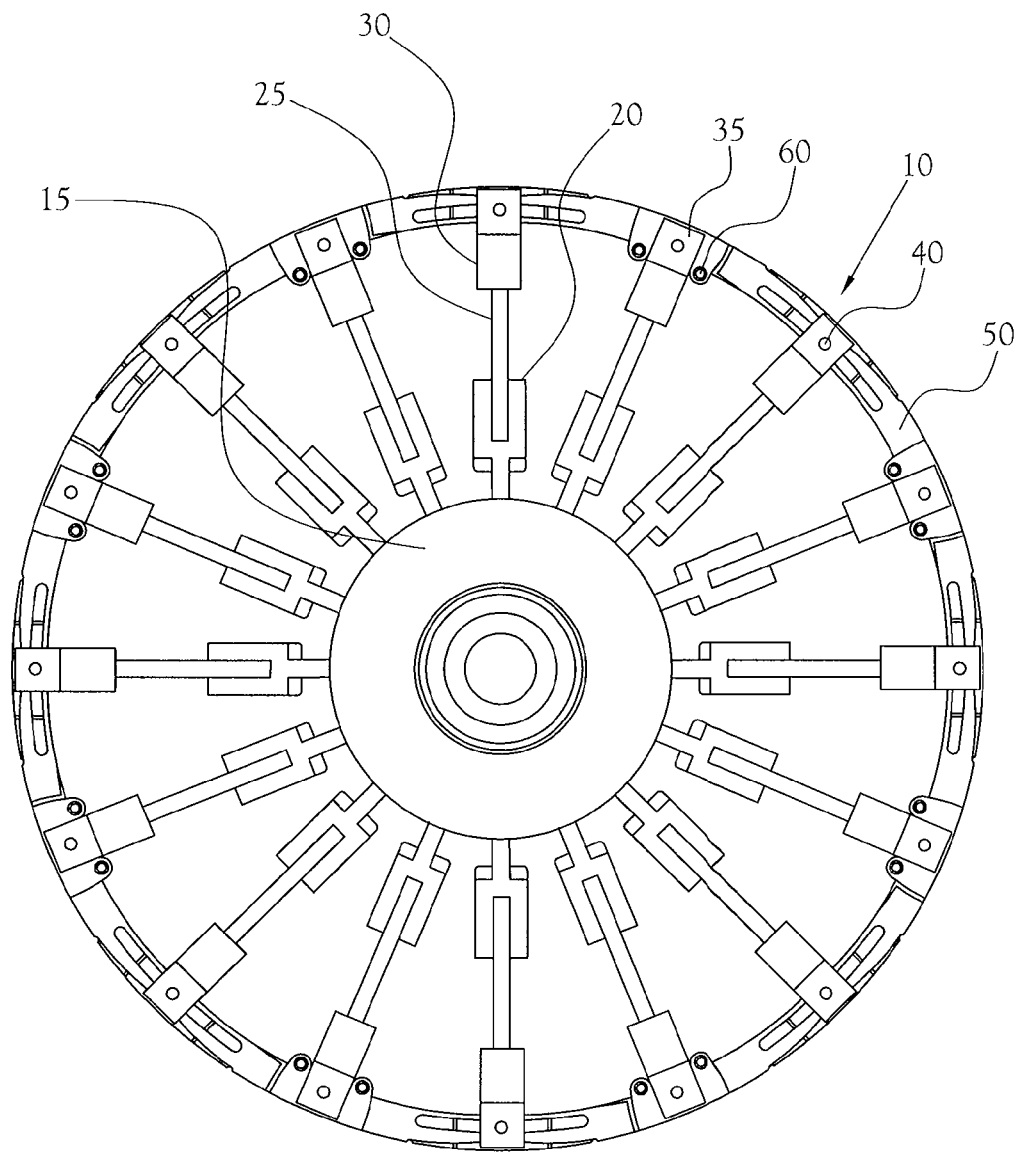
FIG. 1 is an elevation view of one embodiment of a deck in a fully extended position.

A cylindrical deck surface for building tubular assemblies, offering radial support and a wide range of working diameter is disclosed. An expandable deck comprises a plurality of elongated deck carriers mounted upon an expansion mechanism in a generally parallel and cylindrical formation. A fixed rod is mounted upon a deck carrier. A pivot rod is mounted upon a fixed deck mounted on deck carrier. A pivot segment defines a rotation aperture and a guide slot. The rotation aperture is rotatably mounted upon the pivot rod and the guide slot slidingly receives the fixed rod.

Referring to the drawings, in which similarly numbered parts reflect similar parts, there is disclosed a deck 10. The deck 10 is mounted upon a central mechanism 15 which moves axially relative to the cylindrical deck 10 to provide radial movement of the deck 10 through a plurality of yoked first pivot sections 20 and second pivot sections 25. Each second pivot section is pivotally secured to a deck carrier 30. A set of yoked pivot sections 20 and 25 are provided adjacent each end of the elongated deck carrier 30. Tangent guide rods 32 extend between adjacent deck carriers to provide stability for the cylindrical deck. Each guide rod 32 is fixed to one deck carrier 30 and slidingly received in an aperture defined in the adjacent deck carrier 30.

A clamp plate 35 is secured at each end of the deck carrier 30. A fixed rod 40 is secured in an aperture defined in the clamp plate 35 located on each side of the deck carrier 30. A plurality of fixed segments 45 and pivot segments 50 are alternatingly mounted upon the fixed rod 40.

The outer surface 47 of the fixed segment 45 is cambered to provide a smooth cylindrical surface when the deck is in a fully closed position. The fixed segments 45 located on adjacent fixed rods are mirror images. A cap plate 75 extends between clamp plates 35 located on opposing sides of the deck carrier 30 to prevent rotational movement of the fixed segment relative to the fixed rod 40.

Each of the fixed segments defines an aperture adapted to receive a pivot rod 60 extending parallel and spaced from the fixed rod 40. Each of the pivot segments defines an aperture 65 adapted to rotate about the pivot rod 60. Each of the pivot segments 50 defines a curved, elongated guide slot 55 adapted to slidingly receive a fixed rod 40. Each pivot segment is rotatably mounted upon a pivot rod 60 associated with one set of opposing deck carriers 30 and slidingly engaged with the fixed rod of an adjacent set of deck carriers 30 through the guide slot 55. The pivot segment is thus supported at each end regardless of the degree of expansion of the deck 10. Similar to the fixed segments 45, the pivot segments of adjacent deck carriers 30 are mirror images.

The pivot segment 50 includes an outer surface 70 which is cambered to provide a smooth cylindrical surface throughout the range of the drum.

Figure 2:
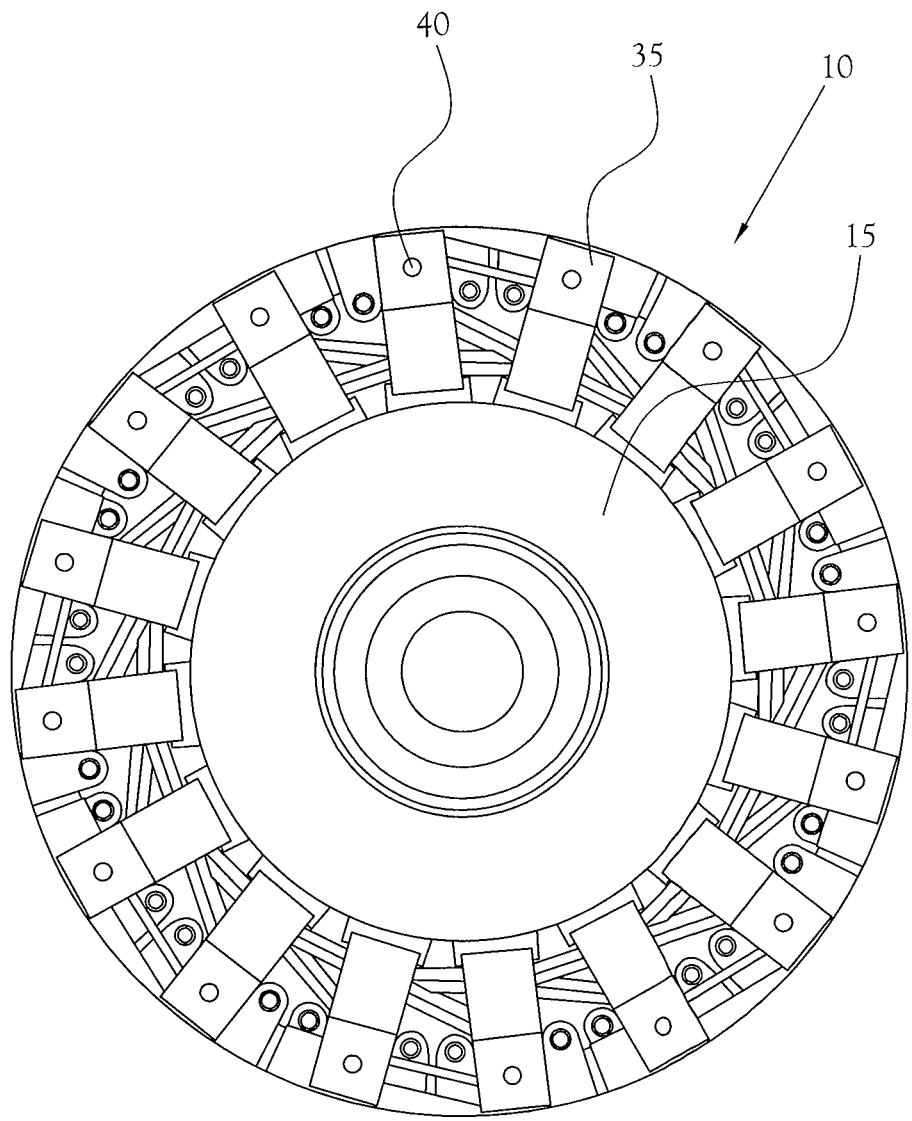
FIG. 2 is an elevation view of one embodiment of a deck in a fully closed position.
Figure 3:
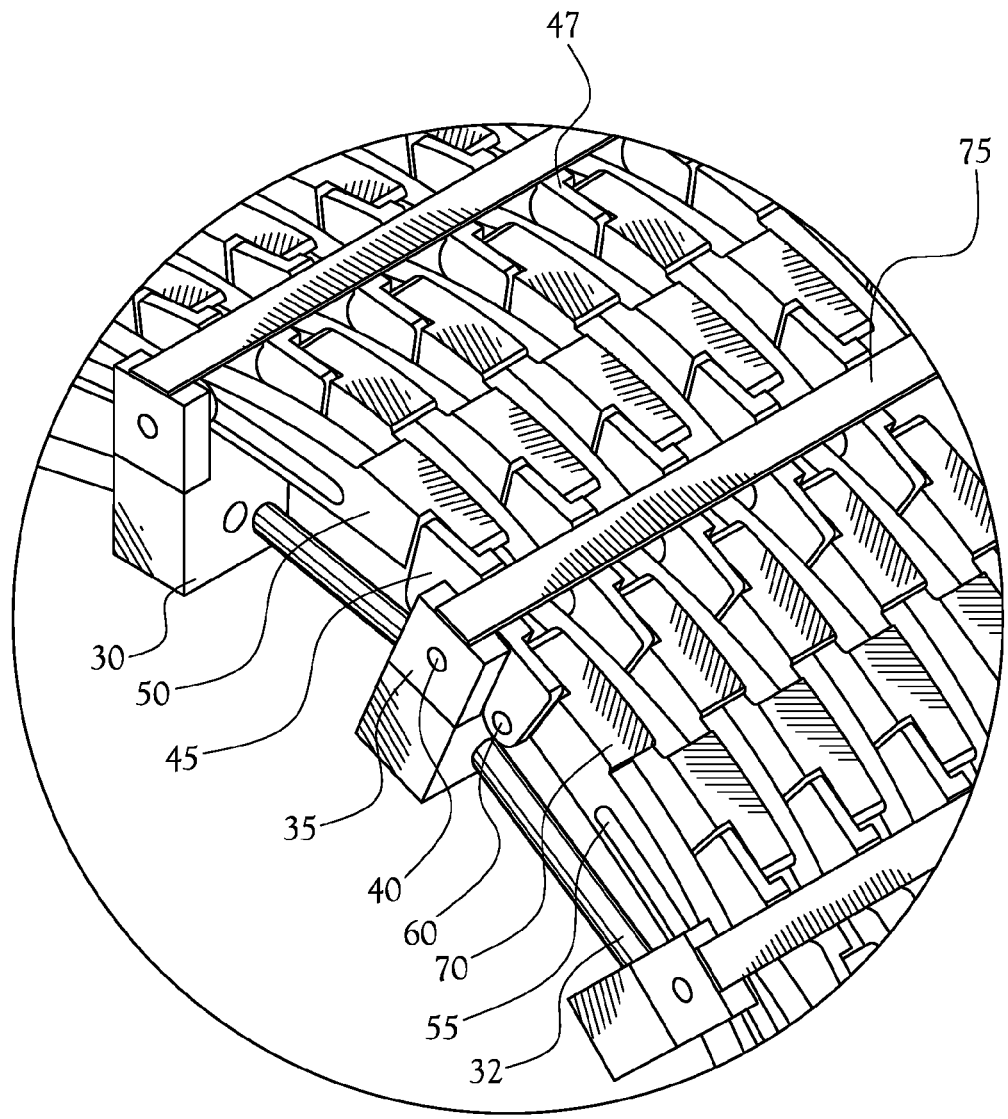
FIG. 3 is a partial perspective view of the deck of FIG. 1.
Figure 4:
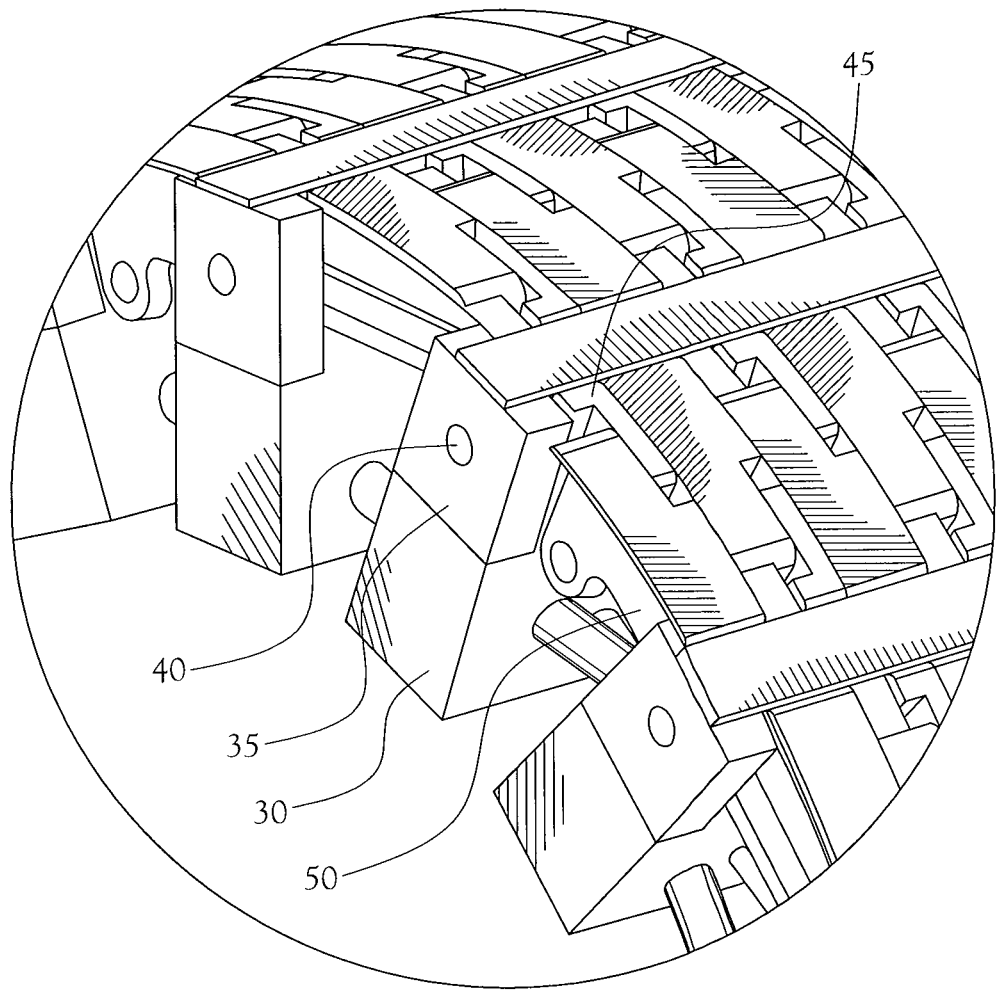
FIG. 4 is a partial perspective view of the deck of FIG. 2.
Figure 5:
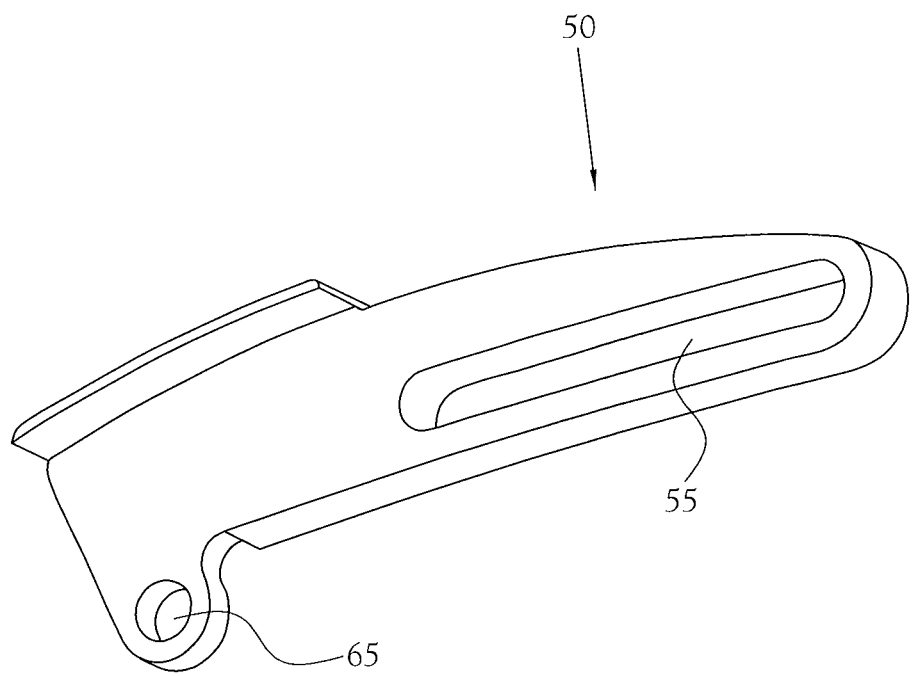
FIG. 5 is a perspective view of one embodiment of a pivot segment adapted for the present invention.

In operation, the deck is infinitely adjustable over a wide range of radii through any of various known central mechanisms known in the art. As the deck is expanded from a fully closed position, as shown in FIG. 2 to a fully open position, as shown in FIG. 1, each of the pivot segments 50 are allowed to rotate about the pivot rod 60 associated with one deck carrier 30 and to slide in an arcuate path about the fixed rod of the adjacent deck carrier 30. Each pivot segment is thus supported at two points over its length over a high range of adjustment to prevent radial distortion either through pressure or centrifugal force which occurs at high speeds of rotation or at package consolidation.

Those skilled in the art will recognize that various widths and shapes of the fixed segments 45 and pivot segments 50 may be used without departing from the spirit and scope of the present invention.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An expandable deck comprising:
   a plurality of elongated deck carriers mounted upon an expansion mechanism in a generally cylindrical formation, each said deck carrier having an elongated dimension extending generally parallel to a central axis of said cylindrical formation;
   a first rod mounted to a first one of said deck carriers and extending along said elongated dimension of said first one of said deck carriers;
   a second rod mounted to an adjacent second deck carrier and extending along said elongated dimension of said adjacent second deck carrier;
   a plurality of pivot segments extending between said first and second deck carriers, each said pivot segment defining a rotation aperture rotatably mounted upon said second rod and a guide slot slidingly receiving said first rod; and
   a plurality of fixed segments secured to said first deck carrier, said fixed and pivot segments being alternatingly mounted along said first rod;
   whereby expansion of said expansion mechanism results in separation of said first deck carrier from said second deck carrier, thereby resulting in rotation of said pivot segments about said second rod and sliding of said first rod along each said guide slot of said pivot segments.

2. The deck of claim 1 wherein each said pivot segment defines an outer cambered surface, said pivot segment outer cambered surfaces cooperating to form a portion of a working surface of said deck.

3. The deck of claim 2, each said fixed segment defining an outer cambered surface, said pivot segment outer cambered surfaces and said fixed segment outer cambered surfaces cooperating to form a portion of a working surface of said deck.

4. The deck of claim 1 wherein each said guide slot is arcuate in shape.

5. The deck of claim 1 further including a plurality of guide rods, each guide rod being fixed to one deck carrier and being slidingly received in an aperture defined in an adjacent deck carrier, whereby said guide rods cooperate to maintain said deck carriers in said general cylindrical formation.

* * * * *